(No Model.)
A. BARLING.
PRUNING SHEARS.
No. 576,989. Patented Feb. 9, 1897.
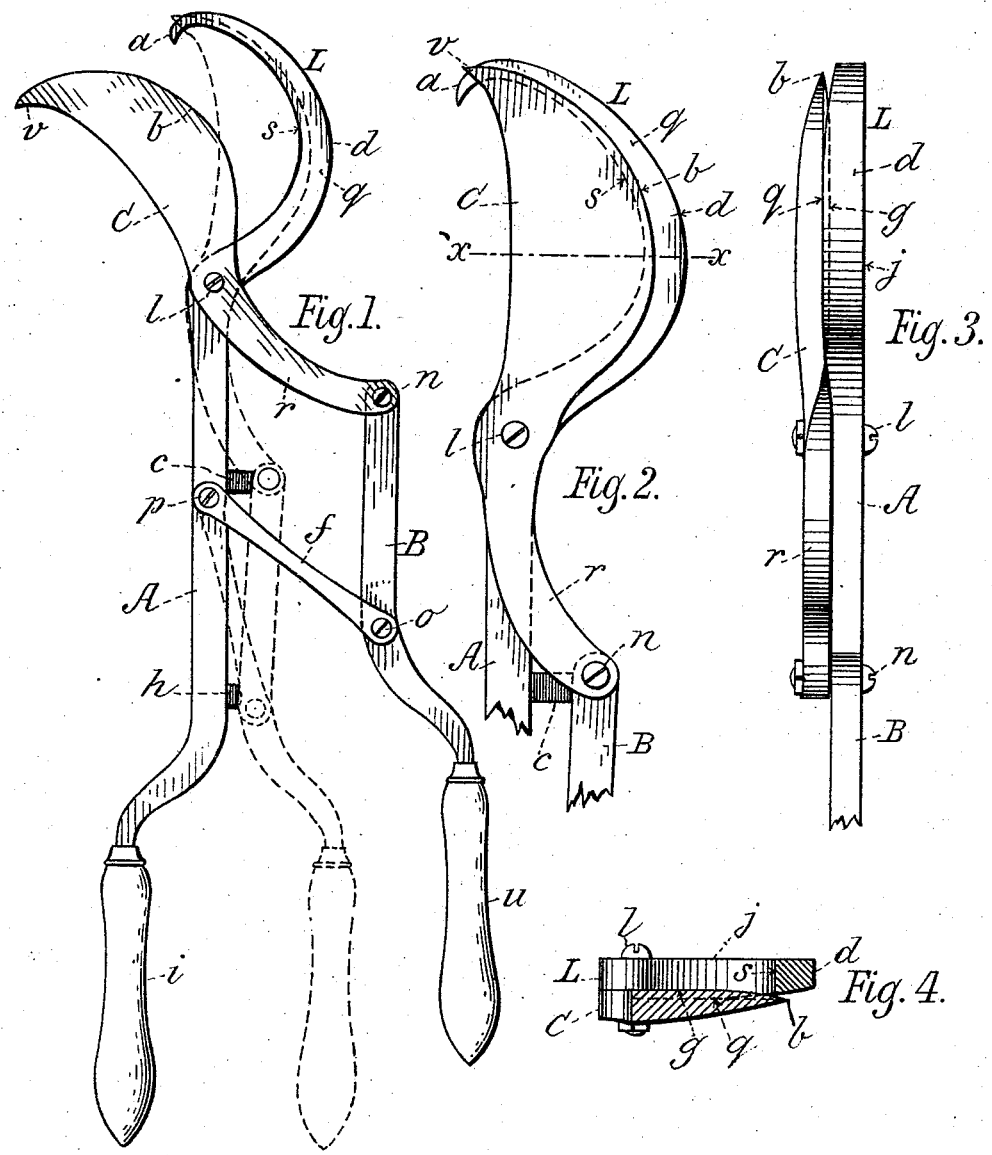
Witnesses:
P. Thiele.
Valt. Breunig.
Albert Barling,
Inventor.
By his Attorney
Fred Artos

UNITED STATES PATENT OFFICE.

ALBERT BARLING, OF MILWAUKEE, WISCONSIN.

PRUNING-SHEARS.

SPECIFICATION forming part of Letters Patent No. 576,989, dated February 9, 1897.

Application filed January 27, 1896. Serial No. 577,089. (No model.)

*To all whom it may concern:*

Be it known that I, ALBERT BARLING, a citizen of the United States of America, residing at Milwaukee, in the county of Milwaukee, State of Wisconsin, have invented an Improved Pruning-Shears, of which the following is a description, reference being had to the accompanying drawings, and to letters of reference thereon, which form a part of this specification, in which—

Figure 1 represents the implement and the position of the movable parts of the same in dotted and in full lines. Fig. 2 shows the upper portion of the shears, on enlarged scale, in closed position. Fig. 3 is the rear end view of the foregoing one, and Fig. 4 is a transverse section of the shears on line $xx$ of Fig. 2.

The invention relates to pruning-shears for trimming trees, hedges, &c.; and it consists chiefly in the construction of parts of the same relating to the operation of the implement, as will be hereinafter fully set forth, and specifically pointed out in the claim.

In describing the invention I refer to Fig. 1 of the accompanying drawings, which fully illustrates the implement. The same consists of a square bar A and lever B and the blade C, of selected metal suitable for the purpose. The upper portion of the said bar A is bent outward and return in shape of a sickle, forming a fixed jaw L, which terminates with an abruptly downwardly inclined upper end portion $a$ and is the curved center portion $q$ of the said jaw, Figs. 3 and 4, gradually strengthened to resist injury which likely may occur at this part of the same. The straight lower portion of the bar is provided at its inner side with, from the material of the bar, projecting nipples $c$ and $h$, arranged in line at a certain distance each from the other, and the top of the same may, if necessary, be covered with removably-fitting caps of some elastic material for protection when acted upon them by operating the shears.

The blade C is constructed to suit the function of cutting gradually a selected limb or bough from trees, hedges, &c., in combination with the aforesaid jaw of the bar A, and said blade consists of a solid piece of metal with convex-shaped and beveled cutting front edge $b$, which is in its extent partially conformed in shape with the contour of the curved jaw to overlap closely the edge $s$ of the same. The back of the blade is rigid and strongly built and in opposition to the front edge $b$ of the same concave-shaped and terminates at its upper end, in connection with the aforesaid cutting front edge of the blade, with a pointed hook $v$, which projects in angular direction from the back of the same.

The lower extending portion of the blade turns into a curved shank $r$, the extreme end $n$ of which is pivotally connected with the upper end of the lever B, while the lower portion of the blade is pivoted at $l$ to the bar A at the points of conjunction of both the bar and the shank with their blade and the jaw. At an equal distance below from the aforesaid points of conjunction $l$ and $n$ of the blade and its shank with the bar A and the lever B a link $f$ is pivoted at its ends $p$ and $o$ to the said bar and the lever to connect the same, and by this means the lever is caused to shift in parallel direction with the bar and exert its power upon the shank $r$ for operating the blade C. The lower ends of the bar A and the lever B are turned outward at a convenient distance from each other and provided with handles $i$ and $u$ to permit easy operation of the implement. The same will be used in the positions as shown in Fig. 1 of the drawings, in which a person holds with the handle $i$ the bar A in one hand, and with the other hand the handle $u$ of the lever B to operate the same and the connected movable blade C. With the inclined end portion $a$ of the jaw L a selected limb or bough is held securely, and with the projecting hook $v$ at the back of the blade other limbs or branches near by and not intended to be cut turned away from the jaw, and the convex-shaped sharp front edge $b$ of the blade in its approach toward the said end portion $a$, which holds the limb or bough, forces and gradually cuts the same through in contact with the edge $s$ of the curved jaw along toward the strengthened middle or center portion $q$ of the same, whereby the lever B in its movement comes now to a stop in contact with the upper nipple $c$ of the bar, at which juncture the blade is in position to exert its full cutting power, and produces thereby a taper cut, which in agriculture is of great importance for the aftergrowth of the stem. In the moment the limb or bough is cut off the lower portion of the lever B will be forcibly pressed from the sudden relief against the lower nipple $h$ on the bar, and weakens thereby the concussion, which otherwise would be painfully felt in the hands and arms of the operator.

Having thus described my invention, I claim—

In a pruning implement, the combination with a handle having a segmental cutting-knife with a hook end, of a cutting-blade pivoted on said handle and also having a hook end, an operating-handle pivoted to said cutting-blade, a link pivotally connecting said operating-handle and the first-mentioned handle at their middles, studs on said first-mentioned handle of different length and adapted to be engaged successively by the operating-handle, substantially as described.

In testimony whereof I have affixed hereunto my signature in the presence of two subscribing witnesses.

ALBERT BARLING.

Witnesses:
P. THIELE,
FRED. ARTOS.